United States Patent
Shergill et al.

(10) Patent No.: US 10,366,067 B2
(45) Date of Patent: Jul. 30, 2019

(54) ADAPTIVE INDEX LEAF BLOCK COMPRESSION

(71) Applicant: Oracle International Corporation, Redwood Shores, CA (US)

(72) Inventors: Kam Shergill, Maidenhead (GB); Vineet Marwah, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 968 days.

(21) Appl. No.: 14/572,765

(22) Filed: Dec. 16, 2014

(65) Prior Publication Data

US 2016/0171053 A1    Jun. 16, 2016

(51) Int. Cl.
*G06F 17/30* (2006.01)
*G06F 16/22* (2019.01)

(52) U.S. Cl.
CPC ...... *G06F 16/2272* (2019.01); *G06F 16/2246* (2019.01)

(58) Field of Classification Search
CPC ......... G06F 17/30336; G06F 17/30327; G06F 16/2272; G06F 16/2246
See application file for complete search history.

(56) References Cited

U.S. PATENT DOCUMENTS

| | | | | |
|---|---|---|---|---|
| 2009/0292679 A1* | 11/2009 | Ganesh | .................. | G06F 17/30 |
| 2010/0114843 A1* | 5/2010 | Farrar | ................. | G06F 16/2272 707/693 |
| 2010/0161569 A1* | 6/2010 | Schreter | .............. | G06F 16/2272 707/696 |
| 2010/0318497 A1* | 12/2010 | Price | ................... | G06F 11/1451 707/674 |
| 2012/0296881 A1* | 11/2012 | Christian | .......... | G06F 17/30336 707/693 |

(Continued)

OTHER PUBLICATIONS

Index compression—IBM DB2 9.7 for Linux, UNIX, and Windows, "Index compression", internet https://www-01.ibm.com/support/knowledgecenter/api/content/nl/enus/SSEPGG_9.7.0, viewed on Jan. 20, 2016, 2 pgs.

(Continued)

*Primary Examiner* — Huawen A Peng
(74) *Attorney, Agent, or Firm* — Hickman Palermo Becker Bingham LLP; Daniel D. Ledesma (57) ABSTRACT

Techniques for compressing leaf blocks of an index are provided. The decision whether (and/or how much) to compress leaf blocks of an index is performed on a per block basis. Thus, for example, some leaf blocks of the index may be compressed while other leaf blocks of the index may be uncompressed. As another example, different leaf blocks of an index may be compressed a different amount. In one technique, a set of index entries is identified for storage in a leaf block. Multiple estimates of potential space savings are calculated for compressing the set of index entries, one estimate for each different variation of a compression technique. The compression technique variation that is associated with the most space savings is selected and applied to the set of index entries. Thus, some techniques prevent negative compression altogether. Additionally, users require no knowledge of the underlying data to perform optimal compression.

22 Claims, 6 Drawing Sheets

(56) References Cited

U.S. PATENT DOCUMENTS

2012/0323929 A1* 12/2012 Kimura ............. G06F 17/30339
707/748
2013/0103655 A1* 4/2013 Fanghaenel ......... G06F 16/2272
707/693
2014/0297651 A1* 10/2014 Shadmon ............ G06F 16/2228
707/741

OTHER PUBLICATIONS

Shergill Jr. , "U.S. Appl. No. 15/267,759, filed Sep. 16, 2016," Office Action, dated Oct. 10, 2018.

* cited by examiner

| | ROWID | A | B | C |
|---|---|---|---|---|
| 110 | 221 | 3 | 5 | 2 |
| 112 | 235 | 6 | 3 | 3 |
| 114 | 245 | 3 | 5 | 4 |
| 116 | 156 | 2 | 3 | 7 |
| 118 | 118 | 1 | 1 | 1 |
| 120 | 246 | 4 | 8 | 2 |
| 122 | 124 | 7 | 4 | 7 |
| 124 | 364 | 2 | 5 | 9 |
| 126 | 123 | 8 | 7 | 6 |
| 128 | 275 | 4 | 6 | 1 |

Table 100, columns 102, 104, 106, 108

ADAPTIVE INDEX LEAF BLOCK COMPRESSION

FIELD OF THE DISCLOSURE

The present disclosure relates to compressing index entries contained in leaf blocks of an index and, more particularly to, adaptively compressing leaf blocks on a per-block basis.

BACKGROUND

Relational databases store information in tables that are organized into rows and columns. In non-relational terminology, a row is a record and a column is a field. A user retrieves information from the tables by entering a request that is converted to queries by a database application, which then submits the queries to a database server. In response to the queries, the database server accesses the table(s) specified by the query to determine which information within the table(s) satisfies the queries. The information that satisfies the queries is then retrieved by the database server and transmitted to the database application and ultimately to the user.

Figure 1:
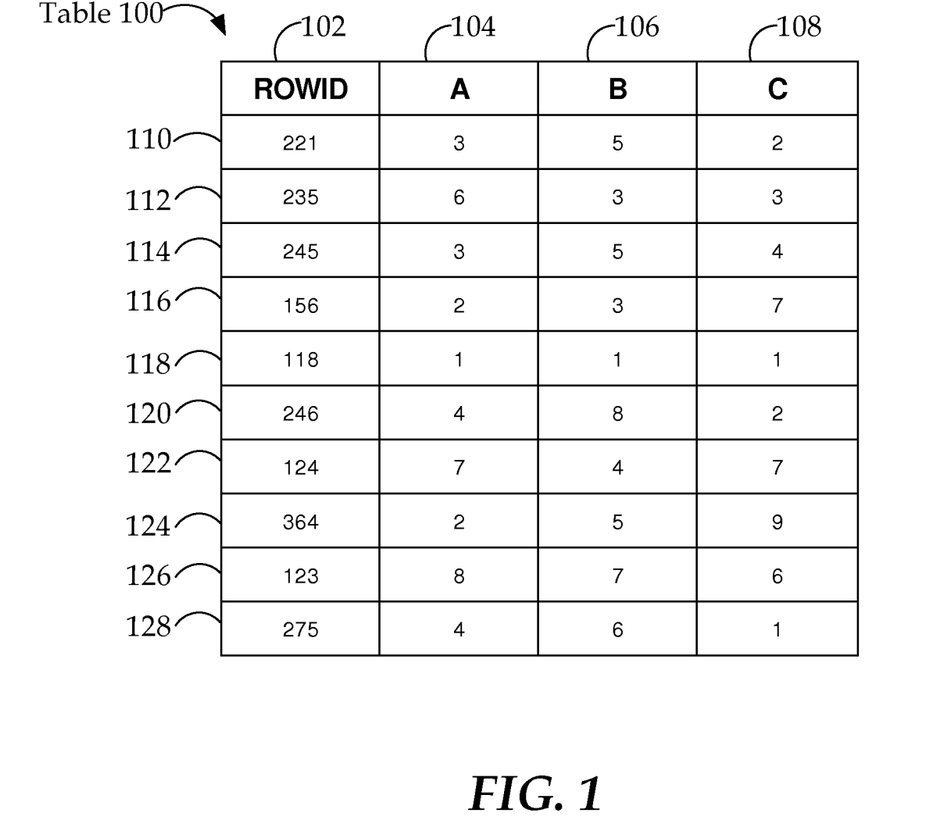
FIG. 1 depicts a logical layout of an exemplary table within a relational database.

FIG. 1 depicts a logical layout of an exemplary table 100 within a relational database. Table 100 comprises three user columns, column A 104, column B 106, and column C 108, and eleven rows 110-128. Table 100 also contains an internal column or pseudocolumn 102, referred to as a rowid. A table's rowid is retrievable by query and uniquely identifies a row in the table, but is not normally displayed when the structure of the table is listed. For example, a rowid of 221 uniquely identifies row 110, which contains the values of 3 in column A 104, 5 in column B 106, and 2 in column C 108. In this example, the values of the columns A 104, B 106, and C 108 are integers, but it is to be understood that columns of a database table can hold values of any of a variety of types including floating point numbers and variable length strings of characters, dates, etc.

For any given database application, the queries to retrieve information from a table must conform to the rules of a particular query language. Most query languages provide users with a variety of ways to specify the information to be retrieved. For example, in the Structured Query Language (SQL), the query, select A from T where A<5, requests the retrieval of the information contained in column A of specified rows of table T that satisfies a specified condition. The conditions in the where clause specify one or more predicates, in this example A<5, which must be satisfied by matching rows. In the example, rows 110, 114, 116, 118, 120, 124, and 128 of table 100 satisfy this query because the corresponding values of column A 104 are 3, 3, 2, 1, 4, 2, and 4, respectively. On the other hand, rows 112, 122, and 126 of table 100 do not satisfy this query because the corresponding values of column A 104 are 6, 7, and 8, respectively.

In order to process the exemplary query, a full table scan may be implemented that reads all the rows from table 100. Thus, the full table scan reads the data for all the columns in table 100, even though only the information from column A 104 was necessary to process the query. If the amount of the rows in a table and/or the data for the columns not used in the query is very large, then the full table scan methodology becomes very inefficient because of the unnecessary amount of disk input/output.

Accordingly, many database systems provide indexes to increase the speed of the data retrieval process. An index is a body of entries ordered by key values of a key. An index key may be, for example, a column of a table. Such a key is referred to herein as a key column. Each index entry identifies a record (e.g. row).

Figure 2:
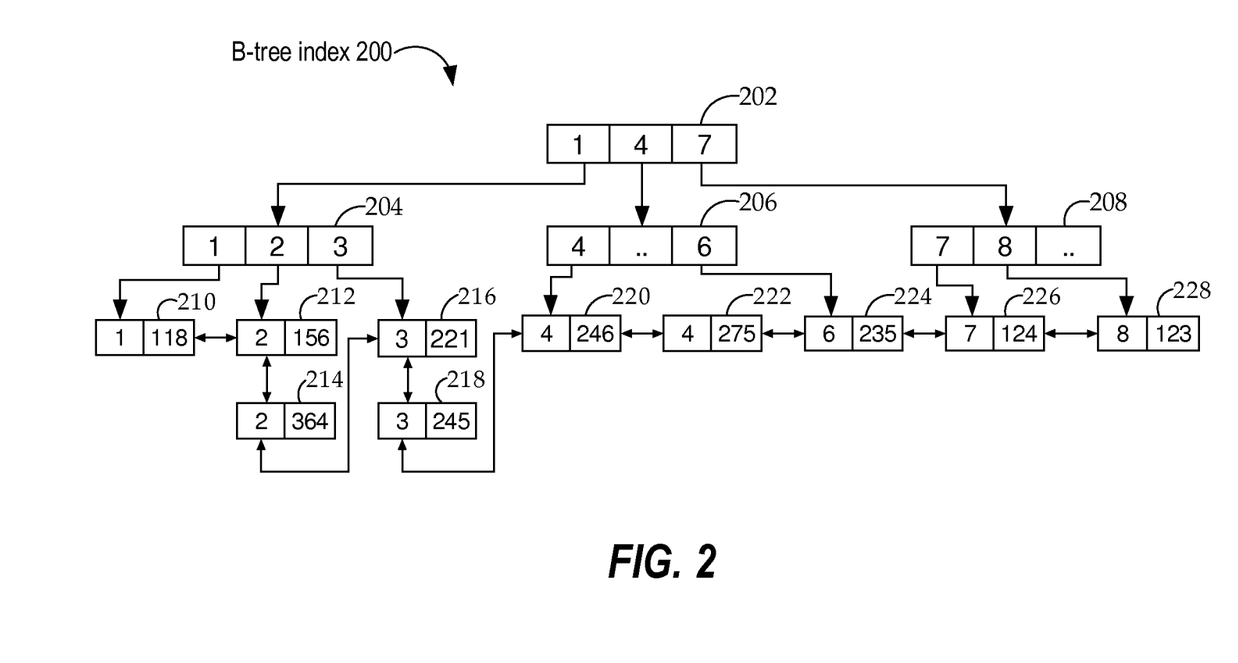
FIG. 2 depicts a logical layout of an exemplary index on the table of FIG. 1.

One implementation of a database index is a B-tree, whose logical layout is illustrated in FIG. 2. A B-tree index is a hierarchical arrangement of two types of nodes: leaf nodes and branch nodes. Leaf nodes reside at the lowest level of the B-tree hierarchy and contain values from the actual column or columns upon which the index is built and the rowid of the corresponding rows. Leaf nodes may comprise multiple entries that contain data for many rows, e.g. 100 entries corresponding to 100 rows, but, for purposes of example, leaf nodes are illustrated as containing a single entry. For example, B-tree index 200, being built upon column A 104 of table 100, has leaf nodes 210-228 collectively holding the values of column A 104. Specifically, leaf node 210 holds the index value 1 from column A 104 and the rowid 118, which identifies row 118 of table 100. As another example, leaf node 228 contains an index value of 8 from column A 104 and a rowid of 123, identifying row 126 of table 100. In the depicted example, each leaf node contains a pointer or other link to a previous and subsequent leaf node if such a leaf node exists. For example, leaf node 226, which contains an index value of 7, points to leaf node 228, which contains an index value of 8, and to leaf node 224, which contains an index value of 6.

The non-leaf nodes of a B-tree index are branch nodes. Branch nodes contain information that indicates a range of values. In the illustrated B-tree index 200, nodes 202, 204, 206, and 208 are branch nodes and, therefore, each corresponds to a range of values. The range of values indicated by each branch node is such that all nodes that reside below a given branch node correspond to the values that fall within the range of values for the given branch node. For example, node 206 is a branch node that corresponds to the numerical range from 4 to 6. Consequently, leaf nodes 220, 222, and 224, all of which reside below branch node 206 in the hierarchy, correspond to values that fall within the range from 4 to 6.

It is not uncommon for a table to have multiple indexes that reference rows of that table. Also, while a typical example of an index indexes a single column of a table, an index that indexes multiple columns of a table is common. As a result of these two factors, a set of indexes for a single table may require more storage space than the actual table. In fact, total index storage for some database systems exceeds 100 GB in size. Due to the size required to store indexes, it becomes imperative to efficiently compress indexes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for compressing index entries contained in leaf blocks of an index. Index entries are compressed on a per-block basis. Thus, some index entries of an index may be compressed while other index entries of the index are not compressed. The determination of whether to compress index entries of a leaf block may be based on whether "negative compression" would result. Also, index entries in one leaf block may be compressed a certain amount while index entries in another leaf block may be compressed a greater amount.

A leaf block is a unit of persistent storage, such as a magnetic disk. The size of a leaf block may correspond to the smallest unit of persistent storage that a database server reads or writes. Alternatively, the size of a leaf block may correspond to a multiple of the smallest unit of persistent storage that a database server reads or writes.

A single leaf node (described previously) may correspond to a single leaf block or may correspond to multiple leaf blocks that are stored consecutively in persistent storage. Although embodiments are not so limited, the following description presumes a one-to-one correspondence between leaf nodes and leaf blocks.

In response to an update to a leaf block, the leaf block may remain compressed. However, inserting an index entry into a compressed leaf block may cause a different amount of compression to be applied to the leaf block or no compression at all.

A benefit to some embodiments include a database administrator (DBA) not being required to set any compression criteria that indicate how much index entries in leaf blocks of an index are to be compressed. Thus, a DBA is not required to have any knowledge of the degree of duplication of data in respective key columns of a table.

As used herein, "compressing a leaf block" is shorthand for compressing index entries that are to be stored in the leaf block. Unless otherwise specified, embodiments are not limited to any particular compression technique.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Example Index Compression Process

Figure 3:
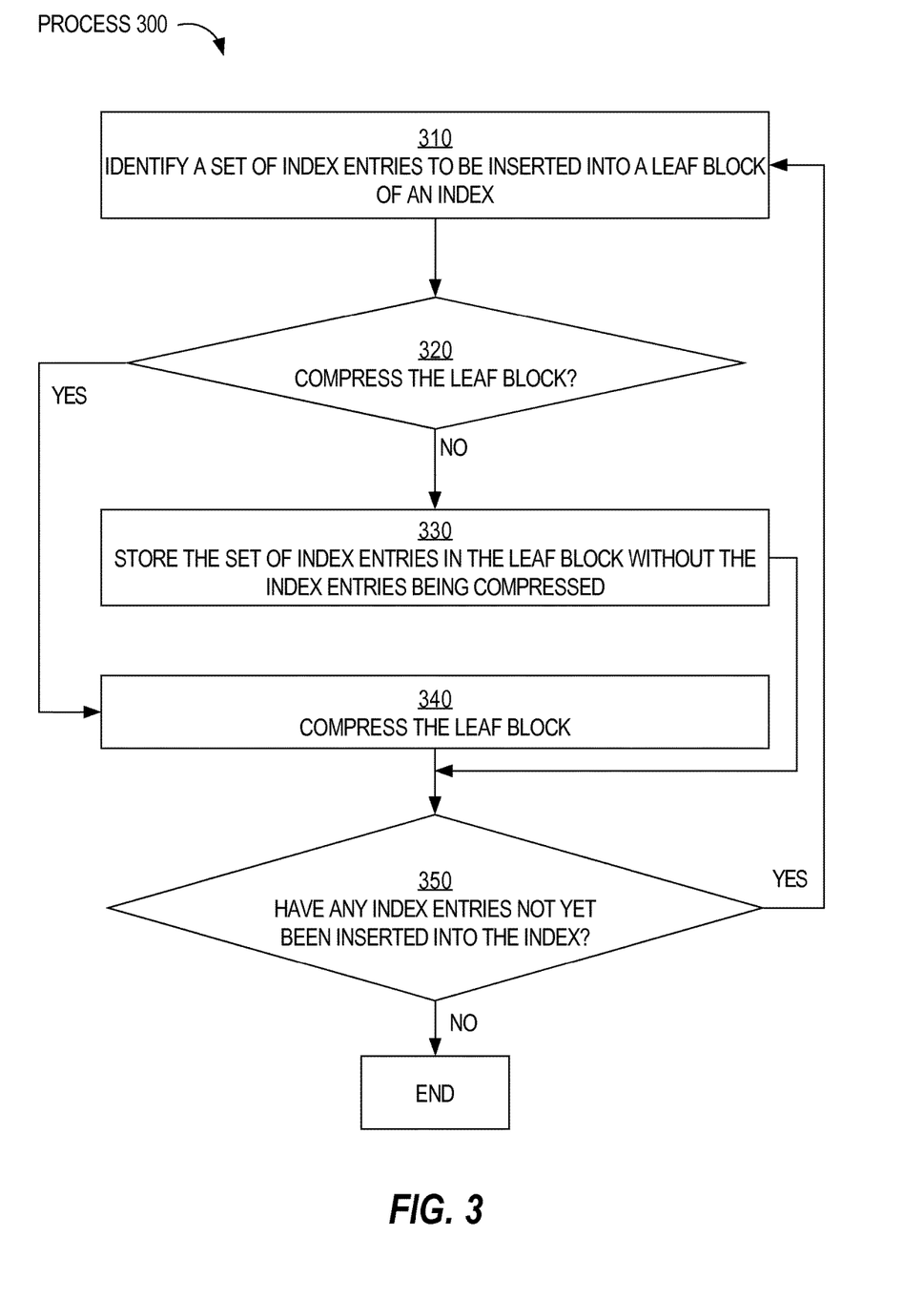
FIG. 3 is a flow diagram that depicts a process for compressing leaf blocks of an index, in an embodiment.

FIG. 3 is a flow diagram that depicts a process 300 for compressing leaf blocks of an index, in an embodiment. Process 300 may be performed as part of an index creation process. Process 300 may be performed by a database server, which may execute on a single computing device or may be distributed such that different instances of the database server execute on multiple computing devices.

At block 310, a set of index entries that are to be inserted into a leaf block is identified. An index entry includes data from one or more columns (referred to as "key columns") of a table. Each index entry includes data from a single row of the table.

Block 310 may involve filling a leaf block in memory, one index entry at a time, until there is insufficient free space to add the next index entry.

At block 320, it is determined whether the leaf block is to be compressed. This determination may be based on one or more criteria. One example criterion is whether compression of the leaf block would result in "negative compression." If so, then process 300 proceeds to block 330. Otherwise, process 300 proceeds to block 340. "Negative compression" is a condition where a compressed set of index entries would require more storage space than if the set of index entries is not compressed. For example, a set of index entries might require 4 KB of storage space while a compressed version of the set of index entries might require 5 KB of storage space. This is possible if there is little (or no) duplication among the key column values in the set of index entries.

Block 320 may involve determining that space savings is achieved by applying a compression technique and that one or more additional (compressed) index entries may be stored in the leaf block. If one or more additional index entries cannot fit in the leaf block, then the leaf block is not compressed, even though a compressed version of the index entries would require less space in the leaf block than the uncompressed version of the index entries. For example, if: (1) a leaf block is 4 KB; (2) exactly 4 KB of uncompressed index entries are candidates for insertion into the leaf block; (3) a compressed version of the index entries would require 3.96 KB of storage space; and (4) one or more additional compressed index entries would not fit in the leaf block, then compression is not applied.

At block 330, the set of index entries are stored in the leaf block without being compressed.

At block 340, the leaf block is compressed. As noted previously, embodiments are not limited to any particular compression technique.

At block 350, it is determined where there are any more index entries that have not yet been inserted into a leaf block of the index. If so, then process 300 returns to block 310 where another set of index entries are identified for insertion into another leaf block. Otherwise, process 300 ends.

After process 300 completes and all (or at least a subset) of the leaf blocks of an index are created, some leaf blocks may be compressed while other leaf blocks may not be compressed.

In a related embodiment, instead of (e.g., only) determining whether to compress a leaf block (in block 320), block 320 involves determining how much compression is performed. Thus, in this embodiment, after process 300 completes, some leaf blocks may be compressed more than other leaf blocks.

Prefix Compression

One example compression technique involves identifying duplicate values across index entries, whether the duplicates are found in a single column or in multiple columns. This type of compression is referred to as duplication reduction compression. For example, the following is set of values that are to be stored in a leaf block:

TABLE A

| A | A | B |
| A | A | C |
| A | B | D |
| A | C | D |

Table A contains values that are to be stored in a leaf block. Each column in table A corresponds to a different column of an underlying table that is stored persistently in storage. Real-world examples of columns include First Name, Last Name, Salary, and Social Security Number.

"Prefix compression" is a specific type of duplication reduction compression. Prefix compression refers to compression where certain columns of a table are considered prefix columns and only those columns are compressed. A "prefix column" is a column where duplicate reduction compression is applied and precedes all other columns that are not compression. A "suffix column" is a column where duplicate reduction compression is not applied. For some leaf blocks of an index, there may be single prefix column. For other leaf blocks of the same index, there may be multiple prefix columns.

While the following description is about prefix compression, embodiments are applicable to suffix compression, where suffix columns are compressed while prefix columns are not. For example, in Table A, the last column would be subject to compression while the first two columns would not.

A "prefix row" is a portion of a row that contains the value(s) of the prefix columns. Thus, a prefix row is a portion of a row for which duplication is leveraged in order to compress a leaf block. A prefix row appears only once in a leaf block. For example, in 1-column prefix compression, the value in the first column is considered a prefix row. In 2-column prefix compression, each pair of values of the prefix columns is considered a prefix row.

A "suffix row" is a portion of a row that contains the value(s) of the suffix columns. Thus, suffix rows are not subject to prefix compression. Accordingly, even though there might be duplicate suffix rows that appear in consecutive index entries that are to be stored in a leaf block, each of the duplicate suffix rows will be stored in the leaf block.

As an example of 1-column prefix compression, duplication in the first (i.e., prefix) column is identified and used to reduce the amount of space that is used to store (in a leaf block) the values in the first column of Table A. Thus, the leaf block stores, for the first column, a single instance of value 'A' (which is in the first prefix row). The values in the second and third columns (i.e., the suffix columns) are stored in their entirety in the leaf block. Each pair of values is associated with a single instance of the value 'A' from the first (i.e., prefix) column.

As an example of 2-column prefix compression, duplication in the first and second columns (i.e., prefix columns) is identified and used to reduce the amount of space that is used to store (in a leaf block) the values in the first and second columns of Table A. Thus, the leaf block stores, for the first two columns, a single instance of the first prefix row, a single instance of the third prefix row, and a single instance of the fourth prefix row. The values in the third column (i.e., the suffix column in this example) are stored in their entirety in the leaf block. In this example, there may not be enough duplication in the first two columns to justify the overhead required to maintain information about the three different instances of the first two columns. In other words, compressing the index entries depicted in Table A using two-column prefix compression may result in negative compression.

If an index only stores values of a single unique column, then prefix compression cannot be used on leaf blocks of the index. If an index only stores values of a single column and that column is not unique, then prefix compression can be used on leaf blocks of the index. If an index stores values of multiple columns and at least one of the columns is not unique, then prefix compression can be used on leaf blocks of the index.

Prefix Compression: Overhead

Like many compression techniques, prefix compression not only may reduce the amount of data that is stored for a particular set of index entries, prefix compression also adds data that is not necessary if prefix compression was not used. Such added data is referred to as "overhead."

Embodiments are not limited to any particular way in which overhead of prefix compression is organized or stored within a leaf block. In an embodiment, an "overhead" array of entries is stored, where each entry stores two values: an offset and a prefix count. For example, depending on the size of the leaf block, the offset may be two bytes and the prefix count may be two bytes. The offset refers to a location, within a leaf block, where the value(s) of the prefix column(s) is/are stored. In an embodiment, the prefix rows are ordered based on their respective values (e.g., alphabetically or numerically). The prefix count refers to where the last suffix row (that is associated with the prefix value(s) referred to by the corresponding offset) is stored in the leaf block.

The suffix rows of a particular prefix row are stored, in a leaf block, contiguously with respect to each other. In an embodiment, the suffix rows are ordered based on their respective values (e.g., alphabetically or numerically).

As an example of 1-column prefix compression for Table A, an entry in an array has an offset that references a single instance of the value 'A' (corresponding to the prefix column) and a count of four (or three if the first row in the leaf block is referred to by a zero), since the last suffix row that has a prefix column value of 'A' is the fourth row in the leaf block. If the entry that stores the prefix count of four is the first entry in the array, then it can be deduced that there are four (4−0=4) consecutive suffix rows, in the leaf block, that share the same prefix column value. If the next row of Table A contains the values 'X', 'Y', and 'Z', then the next entry in the array would indicate (1) an offset in the leaf block where the value 'X' is stored and (2) a count of five if the following row (if any) does not contain the value 'X' in the prefix column. Thus, it can be deduced, based on the prefix count of the first entry being four and the prefix count of the second entry being five, that there is only a single consecutive suffix row in the leaf block that contains the value 'X' in the prefix column.

The offset and prefix count of an overhead array entry allow each suffix row to be associated with the proper prefix row. If there is duplication of prefix rows in a single leaf block, then multiple suffix rows will be associated with a single prefix row in that leaf block.

In a related embodiment, instead of storing an offset that refers to a location in which one or more values of a prefix row are stored, an overhead array entry stores the actual value(s) of the prefix row. For example, in the 1-column prefix compression example described previously, the first entry in the overhead array would store the value 'A' instead of an offset within the leaf block.

Prefix Compression: Calculating Potential Space Savings

In an embodiment, while determining whether to compress a leaf block, an amount of space savings is calculated for each of multiple variations of a compression technique. For example, under prefix compression, it is determined how much space savings would be achieved using 1-column prefix compression and using 2-column prefix compression. If it is determined that using 1-column prefix compression would achieve more space savings than using 2-column prefix compression for a given set of index entries, then that set of index entries will be compressed using 1-column prefix compression.

The following table is another example of index entries that may be considered for compression before storing in a leaf block:

TABLE B

| Column A | Column B | Column C |
|----------|----------|----------|
| aaa | aaa | bbb |
| aaa | aaa | ccc |
| aaa | aaa | ddd |
| bbb | bbb | eee |
| bbb | bbb | fff |
| ccc | ccc | ggg |

Table B includes three columns: Column A, Column B, and Column C. Each row in Table B corresponds to a different index entry that will be stored (or reflected) in a leaf block of an index. The underlying table upon which the index is based may have three columns or may have more than three columns.

The following Table C includes example space savings that are estimated for three variations of prefix compression: 1-column prefix compression, 2-column prefix compression, and 3-column prefix compression. These example space savings are generated during the process of determining whether and/or how much to compress the index entries of Table B (e.g., during performance of block 320). In this example, Table B contains a strict subset of the index entries that are analyzed as a group for prefix compression in a single leaf block.

TABLE C

| 1-column prefix compression | 2-column prefix compression | 3-column prefix compression |
|---|---|---|
| −6 | −6 | −6 |
| −3 | 0 | −12 |
| 0 | 6 | −18 |
| −6 | 0 | −24 |
| −3 | 6 | −30 |
| ... | ... | ... |
| 27 | 60 | −90 |

Each of the first five rows in Table C corresponds to a different set of rows in Table B. The space savings indicated in the first row of Table C indicate how much space savings is achieved by using the three variations of prefix compression on the first row in Table B. The space savings indicated in the second row of Table C indicate how much space savings is achieved by using the three variations of prefix compression on the first two rows of Table B.

The last row in Table C corresponds to the set of rows of Table B along with additional rows that are not depicted in Table B. The space savings indicated in last row of Table C indicate how much space savings is achieved by using prefix compression on the set of rows of Table B and those additional rows.

A negative value in Table C indicates "negative compression" while a positive value in Table C indicates that some space savings is achieved by prefix compression. Negative compression is possible due to each overhead array entry that is required to store prefix information, such as an offset and a prefix count.

For example, the values in the first row of Table C indicate that six bytes are required to store an entry (corresponding to the first prefix row) in an overhead array of a leaf block. Because there are no rows that precede the first row in Table B, there is no space savings for compressing a single prefix row, regardless of whether 1-column prefix compression is used or 3-column prefix compression is used. In fact, negative compression would result if only the first prefix row is compressed. This is so because not only would each of the values in the first row of Table B be stored in the leaf block, but also an overhead array entry that stores an offset and a prefix count (as described previously) would need to be created and stored in the leaf block.

Because there may be duplication in subsequent rows (depending on the number of prefix columns), the prefix count may not be specified until the next prefix row (in Table B) that is not a duplicate of an immediate preceding prefix row is identified.

The first value in the second row of Table C indicates that, under 1-column prefix compression, three extra bytes of overhead are required to compress the first two prefix rows of Table B. The first value in the second row of Table C (i.e., −3) is three bytes better than the first value in the first row of Table C (i.e., −6) because space savings is achieved (i.e., 3 bytes) by not having to store, in the leaf block, the second instance of 'aaa' (which is from the prefix column of Table B, i.e., Column A). The space savings of compressing the second prefix row in this example is three bytes. Thus, the overall space savings if just the first two prefix rows are compressed using 1-column prefix compression is −6+3=−3.

The second value in the second row of Table C indicates that, under 2-column prefix compression, zero extra bytes are required to compress the first two prefix rows of Table B. The second value in the second row of Table C (i.e., 0) is six bytes better than the second value in the first row of Table C (i.e., −6) because some space savings is achieved by not having to store, in the leaf block, the two instances of 'aaa' in the second prefix row of Table B (i.e., Columns A and B). The space savings of compressing the second prefix row in this example is six bytes. Thus, the overall space savings if just the first two prefix rows are compressed using 2-column prefix compression is −6+6=0.

The third value in the second row of Table C indicates that, under 3-column prefix compression, twelve extra bytes of overhead are required to compress the first two prefix rows of Table B. The third value in the second row of Table C (i.e., −12) is six bytes worse than the third value in the first row of Table C (i.e., −6) because no space savings is achieved by having to store the entirety of the second row of Table B. In fact, another entry in the overhead array would need to be created and stored in the leaf block. Thus, −6+(−6)=−12.

The third value in the fifth row is −30, indicating that there are no duplicate prefix rows when using 3-column compression. In this example, five overhead array entries are required to store information about each of the first five rows in Table B.

Figure 4A:
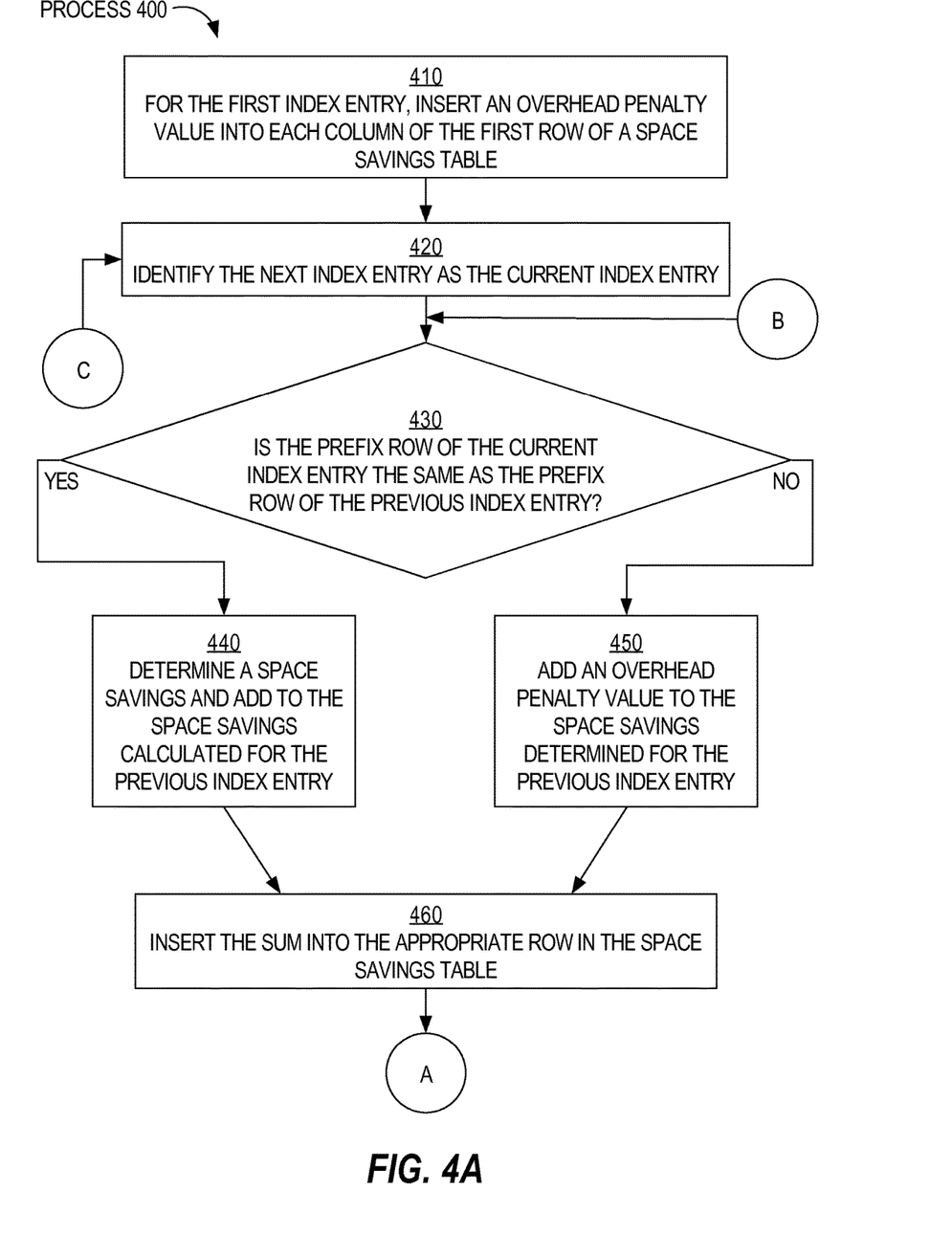
FIG. 4A-4B is a flow diagram that depicts a process for calculating space savings if different variations of prefix compression are applied to a set of index entries, in an embodiment.
Figure 4B:
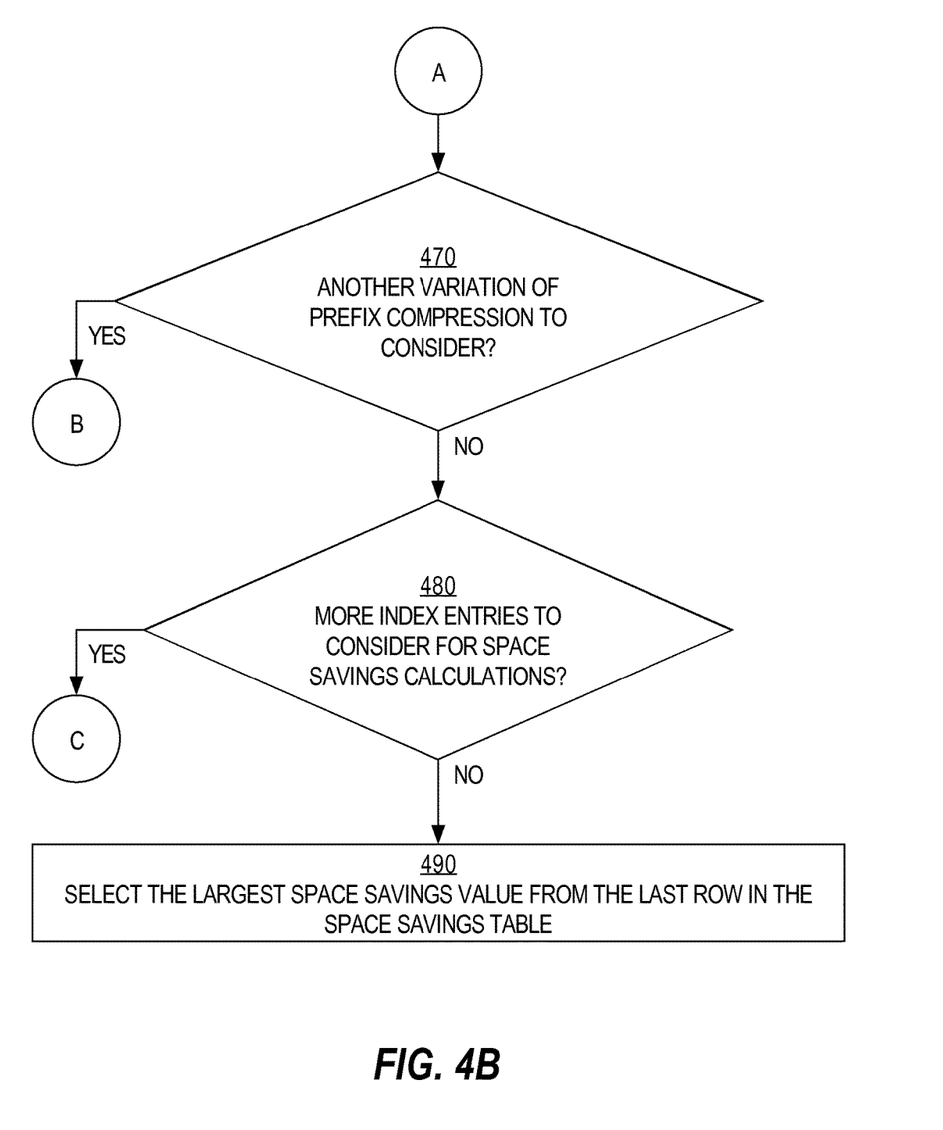

FIGS. 4A-4B is a flow diagram that depicts a process 400 for calculating space savings if different variations of prefix compression are applied to a set of index entries, in an embodiment. The results of the calculations may be inserted into a data structure, similar to Table C, referred to herein as a "space savings table." Other data structures may be used to store the calculations, such as an array or a vector.

As with Table C, each row in the space savings table corresponds to a different set of index entries. Also, each column in the space savings table corresponds to a different variation of prefix compression, such as 1-column prefix compression and 2-column prefix compression.

At block 410, an overhead penalty value is inserted into each column of the first row of the space savings table. Insertion of the overhead penalty occurs regardless of the content of the first analyzed index entry. The overhead penalty value depends on the size of an overhead array entry (that stores information about the first prefix row).

At block 420, the next index entry is identified and becomes the "current index entry." The previously-current index entry becomes the "previous index entry." During the first performance of block 420, the second index entry becomes the current index entry and the first index entry becomes the previous index entry.

At block 430, it is determined whether the prefix row of the current index entry is the same as the prefix row of the previous index entry. If so, then process 400 proceeds to block 440. Otherwise, process 400 proceeds to block 450. The prefix row of the current index entry depends on which variation of prefix compression is being considered at the moment. For example, the prefix row of the second row of Table B under 1-column prefix compression is 'aaa' while the prefix row of the second row of Table B under 2-column prefix compression comprises two values: 'aaa' and 'aaa'.

At block 440, a space savings is determined as a result of the match (in block 430) and is added to the space savings determined for the previous index entry (corresponding to the same variation of prefix compression). For example, in 1-column prefix compression, the space savings of not having to store the second prefix row in Table B (i.e., three bytes) is added to the "space savings" of having to store an overhead array entry (i.e., −6 bytes) for the first prefix row, which addition results in −3 bytes. In other words, the three bytes is added to the value indicated in the previous row (but same column) in the space savings table. As another example, in 2-column prefix compression, the space savings of not having to store the second prefix row in Table B (i.e., six bytes) is added to the value indicated in the previous row (but same column) in the space savings table.

At block 450, an overhead penalty is added to the space savings calculated for the previous index entry (corresponding to the same variation of prefix compression). For example, in 3-column prefix compression, the overhead penalty of having to create another overhead array entry for the second prefix row in Table B (i.e., six bytes) is added to the value indicated in the previous row (but same column) in the space savings table.

At block 460, the sum of block 440 (or block 450) is inserted into the appropriate location in the space savings table. For example, after calculating a space savings of applying 2-column prefix compression to the first two index entries of Table B, the space savings is stored in the second column of the second row of Table C.

At block 470, it is determined whether there is an additional variation of prefix compression that needs to be considered in calculating space savings. If so, then process 400 proceeds to block 430. Otherwise, process 400 proceeds to block 480. If there is only one variation of prefix compression that is considered (e.g., 2-column prefix compression), then block 470 may be skipped and process 400 would proceed from block 460 to block 480.

At block 480, it is determined whether there are more index entries to consider for space savings calculations. If so, then process 400 proceeds to block 420. Otherwise, process 400 proceeds to block 490.

At block 490, after space savings is determined for one or more variations of prefix compression for a particular set of index entries, the largest space savings value (indicated in the last row of the space savings table) is selected and the corresponding compression technique is applied to the index entries. For example, in the last row of Table C, the value in the second column is positive (i.e., 60) and is larger than the values in the other two columns. Thus, 2-column prefix compression would be selected.

Alternatively, if all the space savings sizes indicated in the last row of the space savings table are negative or zero, then no prefix compression is applied to the set of index entries. Instead, the index entries are stored uncompressed in the leaf block. In a related embodiment, a leaf block is not compressed if the largest space savings size is less than a particular threshold (e.g., 50 bytes).

As described previously with respect to FIG. 2, if prefix compression is applied to a set of index entries and space savings is achieved, then additional (compressed) index entries may be added to the leaf block in which the compressed set of index entries will be stored. Additional compressed index entries may be added to the leaf block until no more compressed index entries can fit within the leaf block or until there is a particular amount of free space remaining (e.g., 50 bytes).

In a related embodiment to process 400, instead of performing block 410, block 490 may first involve adding the overhead penalty value to each of the space savings values in the last row of the space savings table. In other words, the overhead penalty for the very first index entry may be added at the end of process 400 instead of at the beginning.

Index Update

In an embodiment, an index with leaf blocks, at least some of which are compressed, is updated. An index update may occur as changes to the underlying table(s) are made. For example, a new row is added to an employee table, where the new row represents a new employee. A corresponding index, which is based on one or more columns of the employee table, is updated by inserting an index entry that points to (or references) the new row in the employee table.

A leaf block may be initially created such that the leaf block contains a certain amount of free space. Such free space may be allotted in light of the understanding that (1) the index is likely to increase in size in the future and (2) index updates that cause leaf blocks to split require a non-trivial amount of processing. For example, adding an index entry to a leaf block is much faster than splitting a leaf block and determining whether and/or how much the two new leaf blocks are to be compressed.

Index Update: Adding Index Entry

In an embodiment, if an index entry cannot be added to a leaf block (whether compressed or uncompressed) due to size limits of the leaf block, then the leaf block is "split." "Splitting" a leaf block involves creating a new leaf block and copying (or moving) a subset of the index entries in the "split" leaf block to the new leaf block.

Thus, if a leaf block is not compressed and a new index entry is to be added to the leaf block, then the new size of the content of the leaf block would be the current size of the existing index entries in the leaf block plus the size of the new index entry. If the new size is greater than the capacity of the leaf block, then the leaf block is split. Otherwise, an uncompressed version of the new entry is added to the leaf block.

If a leaf block is compressed and a new index entry is to be added to the leaf block, then the new size of the content of the leaf block would be the current size of the leaf block plus the size of a compressed version of the new index entry. The type of compression that would be applied to the new index entry would be the same as the type of compression that has been applied to the leaf block. For example, if the leaf block is compressed using 2-column prefix compression, then the new index entry would be compressed using 2-column prefix compression. If the new size is greater than the capacity of the leaf block, then the leaf block is split. Otherwise, a compressed version of the new entry is added to the leaf block.

In a related embodiment, if it is determined that a new index entry cannot be added to a leaf block due to size constraints, then, instead of splitting the leaf block immediately, the leaf block is analyzed again to determine whether a variation of prefix compression should be applied to the index entries of the leaf block and the new index entry. For example, if a leaf block is compressed using 2-column prefix compression and a new index entry cannot fit within the leaf block, then the index entries of the leaf block and the new index entry are analyzed to determine whether another variation of prefix compression (e.g., 1-column or 3-column prefix compression) should be applied to the leaf block and the new index entry. Such an analysis may require much fewer computing resources than the computing resources required to split a leaf block. Similarly, if a leaf block is uncompressed and a new index entry cannot fit within the leaf block, then the index entries of the leaf block and the new index entry are analyzed to determine whether one of prefix compressions (e.g., 1-column or 2-column prefix compression) should be applied to the leaf block and the new index entry.

If, in the end, a leaf block is determined to be split, then a subset (e.g., half) of the index entries stored in the leaf block are copied (or moved) to a new leaf block. If the leaf block is compressed, then the index entries that are moved to the new leaf block may be stored as compressed or uncompressed index entries. The index entries that remain in the "old" leaf block may remain compressed. Alternatively, a compression decision may be made to determine whether the old leaf block may benefit from uncompressing the remaining index entries or performing a different type of compression.

If the index entries that are moved to a new leaf block are to be stored as compressed index entries in the new leaf block, then calculations may be performed (similar to process 400) to determine which variation of prefix compression should be applied to those index entries. Alternatively, the same prefix compression (e.g., 2-column prefix compression) that was used to compress the "old" leaf block may be used to compress the index entries that are moved to the new leaf block.

If the index entries that are moved to a new leaf block are compressed but are to be stored as uncompressed index entries in the new leaf block, then the index entries are first uncompressed by reading the entries of the overhead array to reconstruct the index entries in uncompressed form.

If the leaf block that is to be split is not compressed, then the index entries that are moved to the new leaf block may be stored as compressed or uncompressed index entries. The index entries that remain in the "old" leaf block may remain uncompressed. Alternatively, a compression decision may be made to determine whether the old leaf block may benefit from compressing the remaining index entries.

In an embodiment, an uncompressed leaf block stores analysis history data (e.g., one or more bits) that indicates whether an analysis of the index entries of the uncompressed leaf block has been performed to determine whether to compress the leaf block. If the analysis history data indicates that an analysis has not been performed, then, if it is determined that a new index entry cannot be added to the leaf block due to size constraints, then an analysis of potentially applying one or more compression techniques may be performed (e.g., similar to process 400) relative to the leaf block. An analysis may not have been performed if the leaf block is a result of a leaf block split and the index entries that were stored in the leaf block were uncompressed. If the analysis history data indicates that an analysis has been performed, then performing the analysis again would be yield the same negative result (i.e., compression should not be performed). Therefore, the analysis may be intelligently skipped.

Index Update: Existing Index Entry

In some scenarios, an index entry in a leaf block is modified. For example, a value (in an index entry) corresponding to a salary column is updated after the corresponding employee receives a salary raise. A modification to an index entry of a leaf block may result in a leaf block that is unable to store all the index entries. For example, if multiple suffix rows are associated with a single prefix row and a prefix column of an index entry corresponding to one of the suffix rows is modified such that the index entry cannot benefit from prefix compression, then the leaf block in which the index entry is stored may need to be split to accommodate the updated index entry and the other index entries in the leaf block. As another example, if an uncompressed index entry is modified to add data and, as a result of the modification, the leaf block is not large enough to store the added data, then the leaf block will be split.

In an embodiment, if a modification to an existing index entry would cause the leaf block in which the index entry is stored to become full, such that the leaf block cannot contain all the index entries that are currently stored in the leaf block, then a compression decision is made. If the result of the compression decision indicates that none of the possible compression technique or variations would allow all the index entries to be stored in the same leaf block, then the leaf block is split.

In an embodiment, if a leaf block is updated to remove (or delete) an index entry from the leaf block, then no compression decision is made. In this way, compression decisions may be kept to a minimum. Otherwise, deletions of multiple index values may result in multiple compression decisions and, as a result, multiple re-compressions.

Query Processing

If an index includes leaf blocks generated according to techniques described in herein, then a query processor (or execution engine that executes an execution plan generated for a query) determines whether and, optionally, how each leaf block is compressed. For example, before accessing each of multiple index leaf blocks of an index, a query processor (or execution engine) determines whether the leaf block is compressed. Therefore, while executing a single query, the query processor may determine that some leaf blocks are compressed and that other leaf blocks are uncompressed. If the leaf blocks are compressed using prefix compression, then the query processor (or execution engine) may determine, in response to processing a single query, that some leaf blocks are compressed using 1-prefix compression, other leaf blocks are compressed using 2-prefix compression, and/or other leaf blocks are uncompressed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
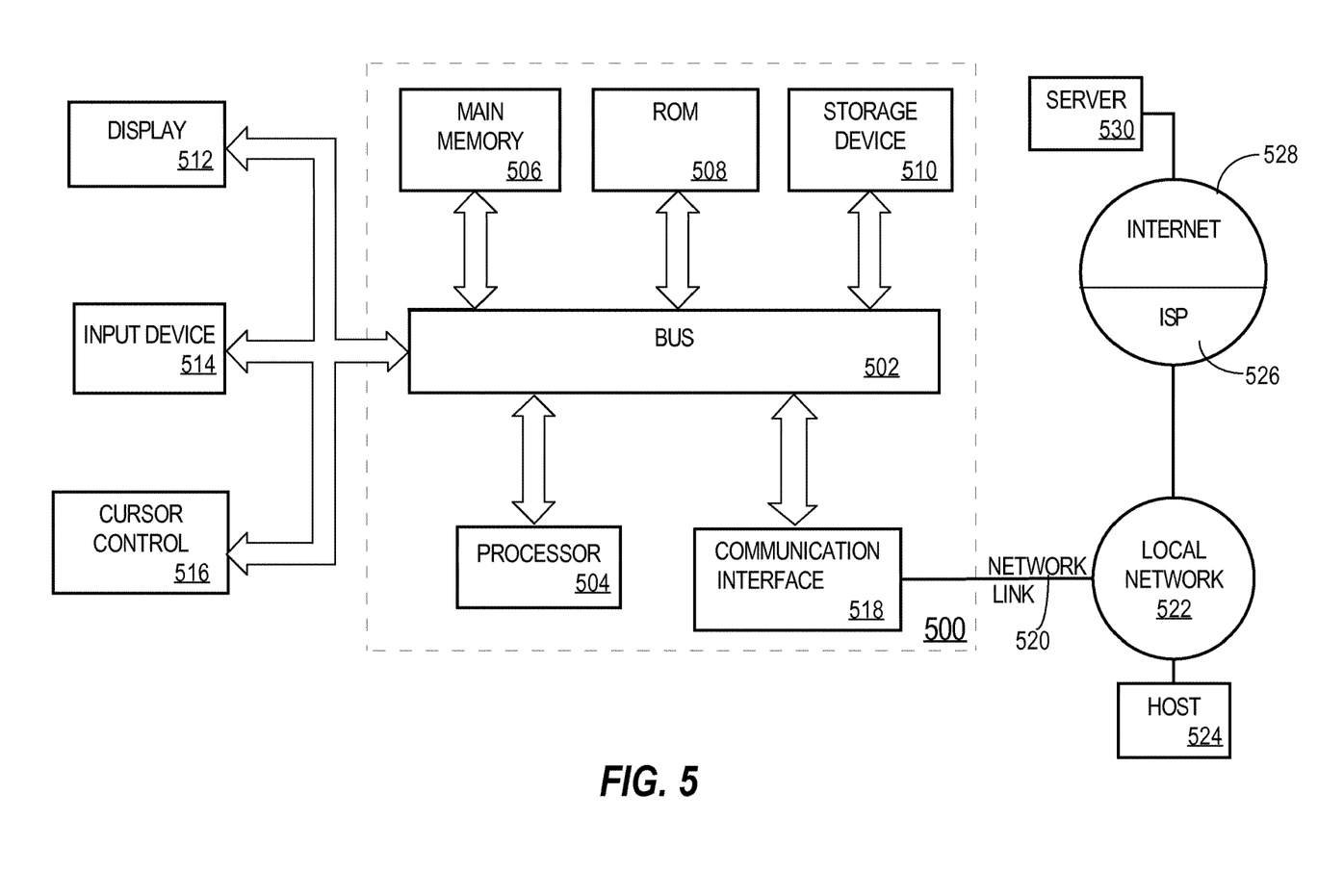
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying a first plurality of index entries that are to be stored in a first leaf block of a plurality of leaf blocks of an index;
    determining whether to compress the first plurality of index entries based on an amount of storage that would be required to store a compressed version of the first plurality of index entries;
    compressing the first plurality of index entries;
    identifying a second plurality of index entries that are to be stored in a second leaf block of the plurality of leaf blocks of the index;
    determining whether to compress the second plurality of index entries;
    determining not to compress the second plurality of index entries that are to be stored in the second leaf block;
    wherein the method is performed by one or more computing devices.

2. The method of claim 1, wherein:
    determining whether to compress the first plurality of index entries comprises:
        determining a first amount of storage that would be required to store a first compression version generated using a first variation of a compression technique;
        determining a second amount of storage that would be required to store a second compression version generated using a second variation of the compression technique,
    compressing the first plurality of index entries comprises compressing the first plurality of index entries using the second variation of the compression technique based on the second amount of storage being less than the first amount of storage.

3. The method of claim 1, wherein:
    determining whether to compress the first plurality of index entries of the first leaf block comprises determining whether compressing the first plurality of index entries would require more storage than not compressing the first plurality of index entries.

4. The method of claim 1, further comprising:
identifying, for compression, a first set of one or more columns of the first plurality of index entries that are to be stored in the first leaf block;
identifying, for compression, a second set of one or more columns of the second plurality of index entries that are to be stored in the second leaf block;
wherein the number of columns in the first set is different than the number of columns in the second set.

5. The method of claim 1, further comprising:
storing, in the first leaf block of the plurality of leaf blocks, a first plurality of compressed indexed entries and first prefix information for a first number of columns;
after storing the first plurality of compressed indexed entries and the first prefix information in the first leaf block, storing, in the first leaf block, instead of the first plurality of compressed indexed entries and the first prefix information, a second plurality of compressed indexed entries and second prefix information for a second number of columns that is different than the first number of columns.

6. The method of claim 1, further comprising:
receiving a particular index entry that is to be inserted into one of the plurality of leaf blocks;
identifying a particular leaf block, of the plurality of leaf blocks, in which to insert the particular index entry;
wherein the particular leaf block stores information about a plurality of index entries;
determining whether the particular leaf block contains enough available storage space to store the information and the particular index entry.

7. The method of claim 6, further comprising:
in response to determining that the particular leaf block does not contain enough available storage space to store the information and the particular index entry, analyzing the plurality of index entries and the particular index entry to determine whether applying a prefix compression technique would allow the plurality of index entries and the particular index entry to be stored in the particular leaf block.

8. The method of claim 6, further comprising:
after determining that the particular leaf block does not contain enough available storage space to store the information and the particular index entry, determining to split the particular leaf block into a first particular leaf block and a second particular leaf block, wherein the first particular leaf block and the second particular leaf block have the same size as the particular leaf block;
storing a first subset of the plurality of index entries in the first particular leaf block;
storing a second subset of the plurality of index entries in the second particular leaf block;
inserting the particular index entry into the first particular leaf block or the second particular leaf block.

9. The method of claim 1, further comprising:
storing, within a particular leaf block of the plurality of leaf blocks, an overhead array that comprises a plurality of entries that includes a first entry and a second entry, wherein the first entry includes a first prefix count and the second entry includes a second prefix count;
locating a particular index entry in the particular leaf block by using the first prefix count and the second prefix count.

10. The method of claim 9, wherein:
the first entry also includes an offset;
locating the particular index entry in the particular leaf block by also using the offset.

11. The method of claim 1, further comprising:
determining to compress the first plurality of index entries that are to be stored in the first leaf block;
compressing the first plurality of index entries;
prior to durably storing the first plurality of index entries in the first leaf block, determining whether one or more additional index entries that are not in the first plurality of index entries may be stored in the first leaf block;
in response to determining that the one or more additional index entries may be stored in the first leaf block, compressing the one or more additional index entries and storing the one or more additional index entries in the first leaf block.

12. One or more non-transitory storage media storing instructions which, when executed by one or more computing devices, cause:
identifying a first plurality of index entries that are to be stored in a first leaf block of a plurality of leaf blocks of an index;
determining whether to compress the first plurality of index entries based on an amount of storage that would be required to store a compressed version of the first plurality of index entries;
compressing the first plurality of index entries;
identifying a second plurality of index entries that are to be stored in a second leaf block of the plurality of leaf blocks of the index;
determining whether to compress the second plurality of index entries;
determining not to compress the second plurality of index entries that are to be stored in the second leaf block.

13. The one or more non-transitory storage media of claim 12, wherein:
determining whether to compress the first plurality of index entries comprises:
determining a first amount of storage that would be required to store a first compression version generated using a first variation of a compression technique;
determining a second amount of storage that would be required to store a second compression version generated using a second variation of the compression technique;
compressing the first plurality of index entries comprises compressing the first plurality of index entries using the second variation of the compression technique based on the second amount of storage being less than the first amount of storage.

14. The one or more non-transitory storage media of claim 12, wherein:
determining whether to compress the first plurality of index entries of the first leaf block comprises determining whether compressing the first plurality of index entries would require more storage than not compressing the first plurality of index entries.

15. The one or more non-transitory storage media of claim 12, wherein the instructions, when executed by the one or more computing devices, further cause:
identifying, for compression, a first set of one or more columns of the first plurality of index entries that are to be stored in the first leaf block;
identifying, for compression, a second set of one or more columns of the second plurality of index entries that are to be stored in the second leaf block;

wherein the number of columns in the first set is different than the number of columns in the second set.

16. The one or more non-transitory storage media of claim 12, wherein the instructions, when executed by the one or more computing devices, further cause:
storing, in the first leaf block of the plurality of leaf blocks, a first plurality of compressed indexed entries and first prefix information for a first number of columns;
after storing the first plurality of compressed indexed entries and the first prefix information in the first leaf block, storing, in the first leaf block, instead of the first plurality of compressed indexed entries and the first prefix information, a second plurality of compressed indexed entries and second prefix information for a second number of columns that is different than the first number of columns.

17. The one or more non-transitory storage media of claim 12, wherein the instructions, when executed by the one or more computing devices, further cause:
receiving a particular index entry that is to be inserted into one of the plurality of leaf blocks;
identifying a particular leaf block, of the plurality of leaf blocks, in which to insert the particular index entry;
wherein the particular leaf block stores information about a plurality of index entries;
determining whether the particular leaf block contains enough available storage space to store the information and the particular index entry.

18. The one or more non-transitory storage media of claim 17, wherein the instructions, when executed by the one or more computing devices, further cause:
in response to determining that the particular leaf block does not contain enough available storage space to store the information and the particular index entry, analyzing the plurality of index entries and the particular index entry to determine whether applying a prefix compression technique would allow the plurality of index entries and the particular index entry to be stored in the particular leaf block.

19. The one or more non-transitory storage media of claim 17, wherein the instructions, when executed by the one or more computing devices, further cause:
after determining that the particular leaf block does not contain enough available storage space to store the information and the particular index entry, determining to split the particular leaf block into a first particular leaf block and a second particular leaf block, wherein the first particular leaf block and the second particular leaf block have the same size as the particular leaf block;
storing a first subset of the plurality of index entries in the first particular leaf block;
storing a second subset of the plurality of index entries in the second particular leaf block;
inserting the particular index entry into the first particular leaf block or the second particular leaf block.

20. The one or more non-transitory storage media of claim 12, wherein the instructions, when executed by the one or more computing devices, further cause:
storing, within a particular leaf block of the plurality of leaf blocks, an overhead array that comprises a plurality of entries that includes a first entry and a second entry, wherein the first entry includes a first prefix count and the second entry includes a second prefix count;
locating a particular index entry in the particular leaf block by using the first prefix count and the second prefix count.

21. The one or more non-transitory storage media of claim 20, wherein:
the first entry also includes an offset;
locating the particular index entry in the particular leaf block by also using the offset.

22. The one or more non-transitory storage media of claim 12, wherein the instructions, when executed by the one or more computing devices, further cause:
determining to compress the first plurality of index entries that are to be stored in the first leaf block;
compressing the first plurality of index entries;
prior to durably storing the first plurality of index entries in the first leaf block, determining whether one or more additional index entries that are not in the first plurality of index entries may be stored in the first leaf block;
in response to determining that the one or more additional index entries may be stored in the first leaf block, compressing the one or more additional index entries and storing the one or more additional index entries in the first leaf block.

* * * * *

UNITED STATES PATENT AND TRADEMARK OFFICE
CERTIFICATE OF CORRECTION

PATENT NO. : 10,366,067 B2
APPLICATION NO. : 14/572765
DATED : July 30, 2019
INVENTOR(S) : Shergill et al.

Page 1 of 1

It is certified that error appears in the above-identified patent and that said Letters Patent is hereby corrected as shown below:

In the Specification

In Column 3, Line 1, delete "FIG." and insert -- FIGS. --, therefor.

In the Claims

In Column 16, Line 56, in Claim 2, delete "technique," and insert -- technique; and --, therefor.

Signed and Sealed this
Fourth Day of August, 2020

Andrei Iancu
*Director of the United States Patent and Trademark Office*